(12) United States Patent
Kuruvilla et al.

(10) Patent No.: US 10,647,049 B2
(45) Date of Patent: May 12, 2020

(54) CONTAINER TRIM CONFIGURATION

(71) Applicant: Tekni-Plex, Inc., Wayne, PA (US)

(72) Inventors: Babu Kuruvilla, Griffin, GA (US); Mark A. Bergeron, Monroe, GA (US)

(73) Assignee: Tekni-Plex, Inc., Wayne, PA (US)

( * ) Notice: Subject to any disclaimer, the term of this patent is extended or adjusted under 35 U.S.C. 154(b) by 443 days.

(21) Appl. No.: 15/423,194

(22) Filed: Feb. 2, 2017

(65) Prior Publication Data

US 2018/0215532 A1 Aug. 2, 2018

(51) Int. Cl.

| B29C 51/26 | (2006.01) |
| B65D 43/16 | (2006.01) |
| B65D 85/32 | (2006.01) |
| B29C 51/00 | (2006.01) |
| B29L 31/00 | (2006.01) |
| B29K 67/00 | (2006.01) |
| B29K 105/04 | (2006.01) |
| B29K 105/00 | (2006.01) |
| B29C 51/44 | (2006.01) |

(52) U.S. Cl.
CPC .......... *B29C 51/266* (2013.01); *B29C 51/002* (2013.01); *B65D 43/162* (2013.01); *B65D 85/32* (2013.01); *B65D 85/324* (2013.01); *B29C 51/445* (2013.01); *B29C 2793/009* (2013.01); *B29C 2793/0009* (2013.01); *B29K 2067/00* (2013.01); *B29K 2105/04* (2013.01); *B29K 2105/256* (2013.01); *B29L 2031/7168* (2013.01); *B65D 2543/00194* (2013.01); *B65D 2543/00296* (2013.01); *B65D 2543/00361* (2013.01)

(58) Field of Classification Search
CPC ................. B29C 51/002; B29C 51/266; B29L 2031/7168; B65D 21/0209; B65D 43/162; B65D 85/324
USPC ............... 206/521.1; 220/270, 810, 836–837
See application file for complete search history.

(56) References Cited

U.S. PATENT DOCUMENTS

| 1,846,561 | A | * | 2/1932 | Koppelman | ......... B65D 85/324 |
| | | | | | 206/521.1 |
| 6,012,583 | A | | 1/2000 | Ramirez | |
| D506,932 | S | | 7/2005 | Ramirez | |
| 8,695,803 | B2 | | 4/2014 | Blanchette et al. | |
| 8,851,315 | B2 | | 10/2014 | Vovan | |
| 9,169,058 | B1 | * | 10/2015 | Ramirez | ............... B65D 85/324 |
| 9,340,350 | B2 | | 5/2016 | Kuruvilla et al. | |
| 2009/0090712 | A1 | * | 4/2009 | Vovan | .................... B65D 21/02 |
| | | | | | 220/23.86 |

(Continued)

OTHER PUBLICATIONS

Pactiv/Interplast clear plastic egg carton photo with tab at hinge edge (Dec. 2016).

*Primary Examiner* — Mollie Impink

(74) *Attorney, Agent, or Firm* — Polsinelli, PC

(57) ABSTRACT

To guard against injury to persons engaging the trim edges of a hinged container, a protective flap extends from the lid on either end of the axial hinge. The flaps extend from the corners of the lid adjacent respective trim edges of the hinge. The flaps have a rounded bottom portion which is extended past the axial hinge line. The curved structure of the protective flaps helps to gently deflect objects, such as fingers, away from any sharply angled trim edges of the hinge, thereby guarding handlers from accidental injury.

11 Claims, 7 Drawing Sheets

(56) References Cited

U.S. PATENT DOCUMENTS

| | | | |
|---|---|---|---|
| 2010/0147730 A1* | 6/2010 | Archambault | B65D 85/32 206/521.1 |
| 2013/0048527 A1 | 2/2013 | Ramirez et al. | |
| 2013/0183412 A1 | 7/2013 | Ramirez et al. | |
| 2014/0138383 A1* | 5/2014 | Lisowy | B65D 43/162 220/270 |
| 2015/0329249 A1* | 11/2015 | Gingras | B65D 43/0235 220/270 |
| 2018/0215517 A1* | 8/2018 | Vovan | B65D 55/024 |

* cited by examiner

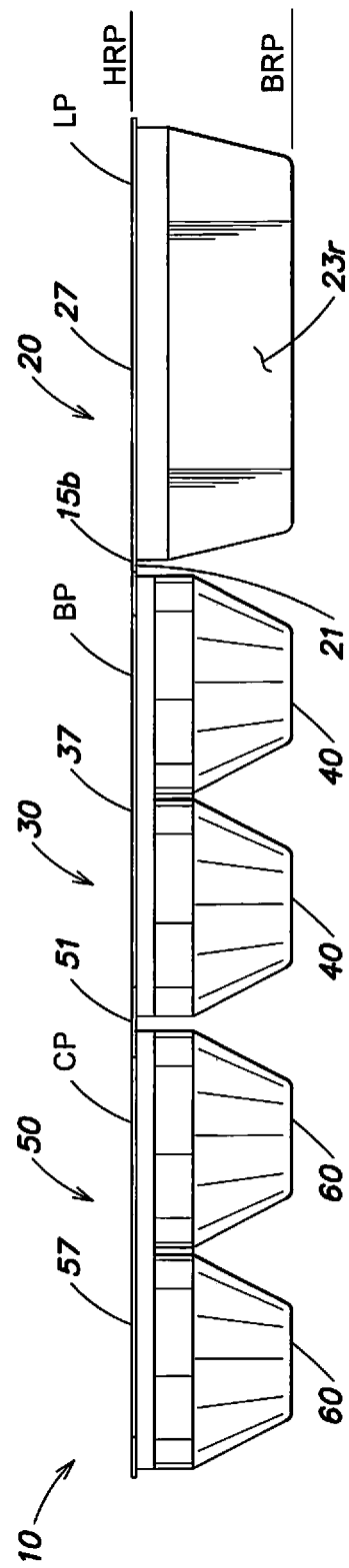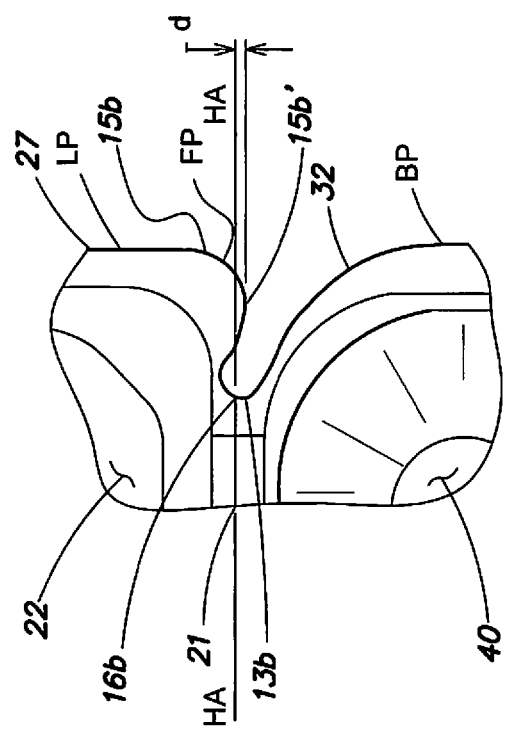

CONTAINER TRIM CONFIGURATION

FIELD OF THE INVENTION

The present invention relates to a hinged plastic container having a trim configuration adapted to increase user safety.

BACKGROUND OF THE INVENTION

Plastic containers are in widespread use in the food industry and typically include a lid and a base, hingedly connected along one edge, allowing the container to be opened and closed repeatedly to access the contents. One example is a plastic egg carton, wherein the hinge allows eggs to be selectively retrieved from the container without risk of dropping or misplacing the carton lid. The hinge also assists in guiding the lid into a closed and secured position.

Egg cartons are commonly composed of plastic materials as plastics are non-absorbent and allow for inexpensive and rapid mass production while also allowing various structural reinforcing elements to be included in the carton's construction. The hinge is commonly provided as part of a peripheral flange on the carton perimeter for ease of manufacturing as well as the added rigidity a flanged hinge brings to the egg carton. The increased rigidity of the carton reduces the risk of the container collapsing when in a vertically stacked configuration and reduces the risk of the eggs breaking due lateral forces applied to the container (e.g., when a consumer grabs a closed container in one hand and squeezes inwardly). In these cases, however, the corners (trim edge configuration) of the flanged hinge can pose a safety hazard to users due to the corners presenting sharply angled and exposed plastic edges (see e.g., the sharply angled edges at each end of the hinge in the prior art cartons of FIGS. 1A and 1B). Manufacturing the trim, at the ends of hinge, so that it presents rounded corners when the egg carton is closed presents manufacturing difficulties. Bringing the hinge flush with the external walls of the carton may greatly reduce the structural rigidity of the package and/or provides a generally less appealing aesthetic than a flanged hinge.

Thus there is a need to manufacture a hinged plastic container, such as an egg carton, that is less likely to harm a user handling it, while still maintaining the structural and aesthetic advantages of the flanged carton.

SUMMARY OF THE INVENTION

In accordance with one embodiment of the invention, a hinged container is provided for protecting users handling the container from being injured by sharp angled trim edges of a hinge connecting a lid portion to a base portion of the container.

A folded hinge connection is provided along one edge of the container and enables the lid to pivot between a closed position over the base and an open position. The hinge connection includes two planar flange surfaces of the lid and base converging along a single hinge axis so that the flange surfaces are substantially coplanar when the lid and base are positioned open. When the lid and base are in a closed position, the flange surfaces of the lid and base are folded along the axis one atop the other in a face to face (mating flanged) configuration.

The flanged lid-base hinge connection extends laterally outwardly from the closed carton and bolsters the structure, making it less likely to buckle under externally applied forces. The flanged hinge also provides an aesthetically pleasing profile, important for display in stores. To guard against injury to persons engaging the container, a protective flap extends from the lid on either end of the axial hinge. In the present embodiment, the flaps extend from the corners of the lid adjacent respective trim edges of the hinge. The flaps have a rounded bottom portion which is extended past the axial hinge line. The curved structure of the protective flaps helps to gently deflect objects, such as fingers, away from any sharply angled trim edges of the hinge, thereby guarding handlers from accidental injury. When the lid and base are in the open position, the flaps extend from the lid toward the base. To accommodate the flaps, a rounded (e.g., tear drop shaped) inlet separates adjacent perimeters of the base and lid, the inlet providing a clearance (space) for the flap when the lid and base are in the open position. Thus, the protective flaps protect users from any sharp trim edges at the folded hinge line, while maintaining the structural and aesthetic benefits of the flanged hinge configuration.

In one embodiment, a plastic thermoformed hinged container is provided comprising:

a thermoformed plastic sheet having a trim edge and comprising a lid and a base formed from a thermoformable plastic material;

the thermoformed sheet including a hinge connection between adjoining edges of the lid and base for pivoting of the lid and base between open and closed positions;

the lid and base in the closed position forming a generally rectangular perimeter of the closed container with the hinge connection forming one edge of the rectangular perimeter;

the hinge connection comprising:
a hinge line aligned along an axial hinge axis;
abutting planar wall portions of the lid and base adjacent either side of the hinge line having upper planar wall surfaces lying in a common plane when the lid and base are in the open position, the upper planar wall surfaces being in mating planar engagement while the hinge line forms the one edge of the container perimeter when the lid and base are in the closed position;
the hinge line and abutting planar wall portions having opposing first and second trim edges recessed inwardly from the rectangular perimeter; and
first and second protective flaps extending from the lid and spaced from the first and second trim edges by first and second rounded trim edge inlets, respectively, the flaps forming hinge guards restricting access to the first and second trim edges of the hinge line, wherein each flap has a rounded trim edge perimeter that lies in the common plane and overlaps the hinge line.

In one embodiment, the lid and base each have a respective trim edge perimeter that meet to form, at each of the first and second trim edges of the hinge line, the rounded trim edge inlet connecting the trim edge perimeter of the base with the trim edge perimeter of the lid.

In one embodiment, the rounded trim edge inlet separates the flap from the base trim edge perimeter.

In one embodiment, the thermoformed plastic sheet comprises a non-foamed solid sheet of plastic material having a thickness of at least 0.01 inches.

In one embodiment, the thickness of the thermoformed plastic sheet is in a range of from 0.01 inches to 0.05 inches.

In one embodiment, the plastic material comprises one or more of polyester, polyolefin, and polylactic acid, including homopolymers, copolymers, and blends thereof, and including virgin and reclaimed materials.

In one embodiment, the plastic material is a foamed material.

In one embodiment, the plastic thermoformed hinged container of claim 1 is provided, wherein:

the plastic material is a non-foamed material.

In one embodiment, the container comprises an egg carton.

In one embodiment, the plastic thermoformed hinged container of claim 9 is provided, wherein:

the egg carton is a bi-fold egg carton.

In one embodiment, the thermoformed plastic sheet further comprises a cover, the cover being hingedly connected to another edge of the base lying parallel to and opposing the hinge line, for pivoting of the cover and base between open and closed positions, wherein in the closed position of the container, the cover is closed over the base, and the lid is closed over the closed cover and base.

In one embodiment, the container is an egg carton comprising a non-foamed solid sheet of polyester material of a thickness in a range from 0.01 to 0.05 inches.

In one embodiment, a method of forming the hinged container is provided including steps of:

thermoforming a sheet of thermoformable plastic material to from the lid and base;

trimming a peripheral edge of the thermoformed sheet to form the trim edges of the lid, the base, the abutting wall portions of the lid and base, the flaps and the inlets.

These and other features of the invention will be better understood from the following detailed descriptions and accompanying drawings.

BRIEF DESCRIPTION OF THE DRAWINGS

FIG. 6 is a left side elevational view of the open carton of FIG. 5; and

FIG. 7 is an enlarged view of a portion of the open lid and base at one end of the hinge showing the tear drop hinge flap and inlet.

DETAILED DESCRIPTION OF THE INVENTION

Figure 1A:
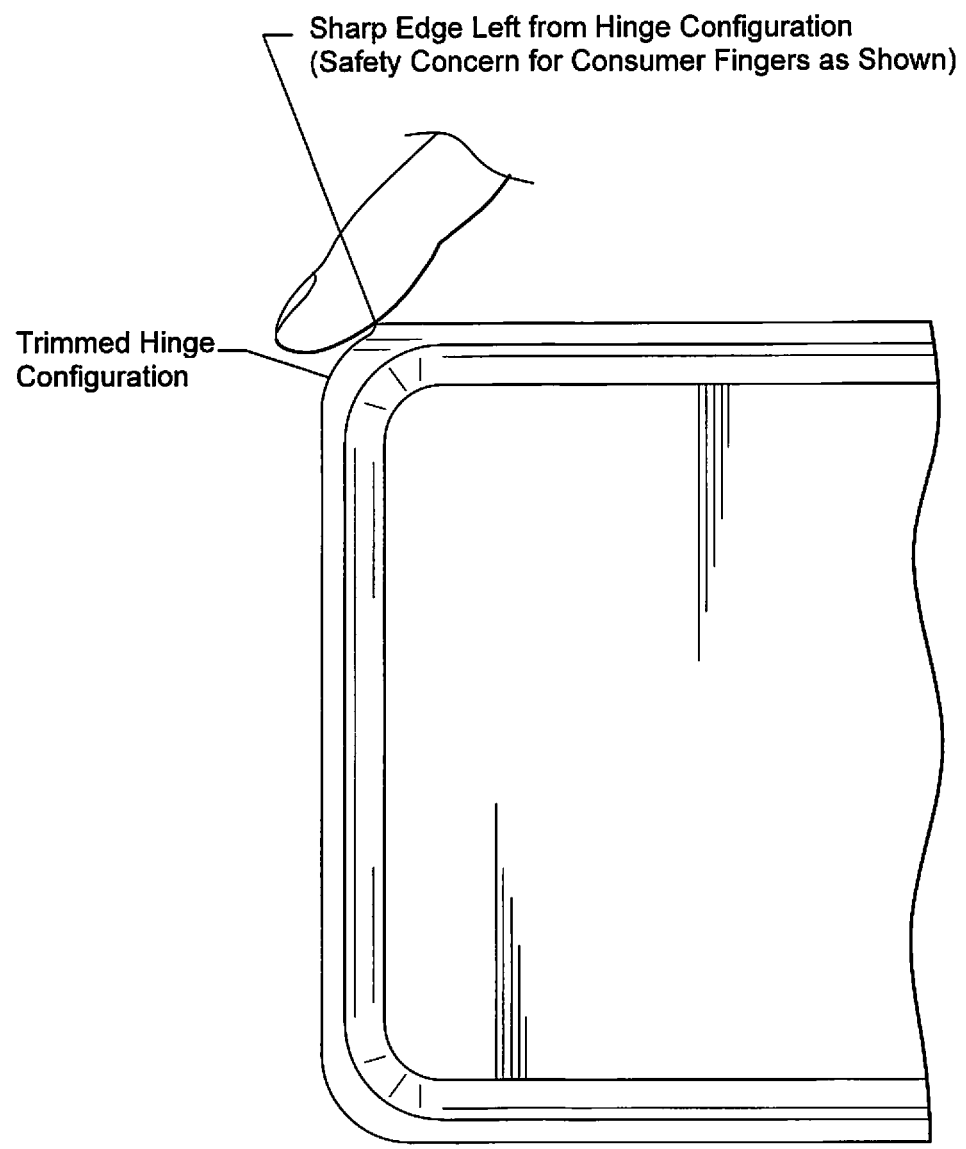
FIGS. 1A and 1B are schematic views of two prior art egg cartons having exposed sharply angled trim edges at the hinge line that pose a potential safety hazard.

FIGS. 2-7 illustrate one embodiment of a tri-fold plastic egg carton 10 according to the invention, the carton holding 12 eggs in a 2×6 rectilinear array, with each egg in an individual cell pocket, the cell pockets beings formed when a 2×6 array of cover cells 60 are positioned over a complimentary aligned 2×6 array of base cells 40. Egg cartons of this type are described in Ramirez US 2013/0183412 entitled, "Tri-fold Egg Carton for Jumbo Eggs," the disclosure of which is herein incorporated by reference in its entirety.

The carton is formed as a single formed sheet of plastic material that includes a lid 20 connected via a first hinge 21 to a rear longitudinal edge 31r of a base 30, the base comprising a plurality of egg receiving cells 40 arranged in a 2×6 matrix. The sheet further includes a cover 50 connected via a second hinge 51 to an opposing front longitudinal edge 31f of the base. The first and second hinges 21, 51 each have a respective axial hinge line HA that lies in a common hinge reference plane HRP that is parallel to a base reference plane BRP in which the base of the carton rests. In use, the cover 50 is rotated (from the open position) about second hinge 51 to a position on top of the base 30 (enclosing eggs in individual cell pockets formed by mating cover cells and base cells), followed by rotating the lid 20 about first hinge 21 to a closed position on top of the assembled cover and base. In the closed configuration, the rectangular carton 10 occupies a volume having a length L, a width W, and height H (where H is transverse to a base reference plane BRP on which the base of the assembled carton rests).

In the present embodiment, the carton 10 is integrally formed from a sheet of molded plastic material, e.g., a clear solid sheet of polyester, such as polyethylene terephthalate (PET); alternative polymers are described below. The sheet from which the carton is integrally molded can be shaped (formed) by a molding process, e.g., thermal pressure forming with a plug assist in a mold to form the shaped lid, base, and cover portions, each including a peripheral flanged edge, and then removing (trimming) any remaining portions of the sheet edges to form an integral carton. More specifically, the carton may be formed between a female die cavity and a cutting edge punch having a knife edge, the cavity and punch being brought together to sever (cut) the flanged edges 27, 37, 57 from the sheet. The formed sheet has a perimeter (trim edge after trimming) that includes the peripheral flanges 27, 37, 57 of each of the lid 20, base 30 and cover 40, respectively. Other methods are known and can be used for forming the carton.

Figure 2:
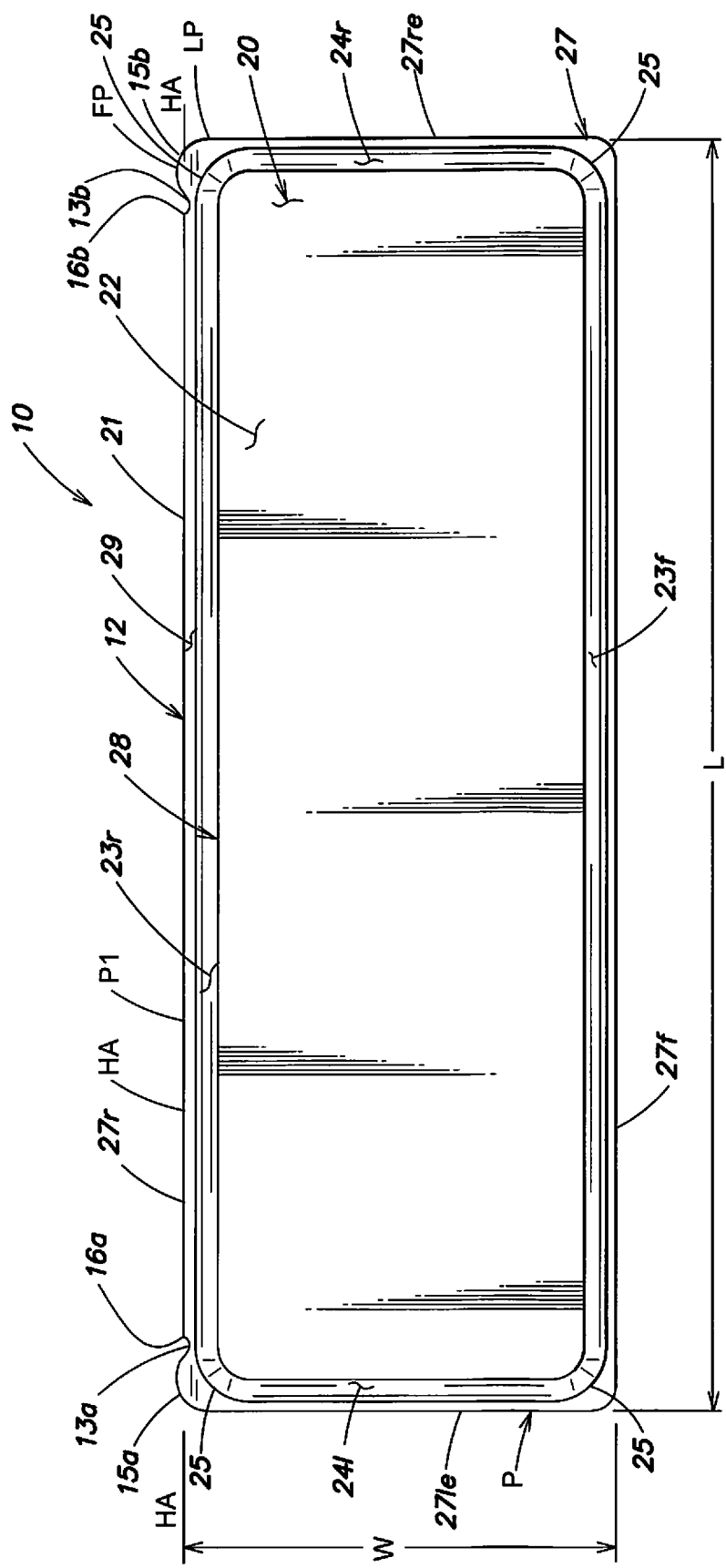
FIG. 2 is a top plan view of a closed egg carton in accordance with one embodiment of the invention.
Figure 3:
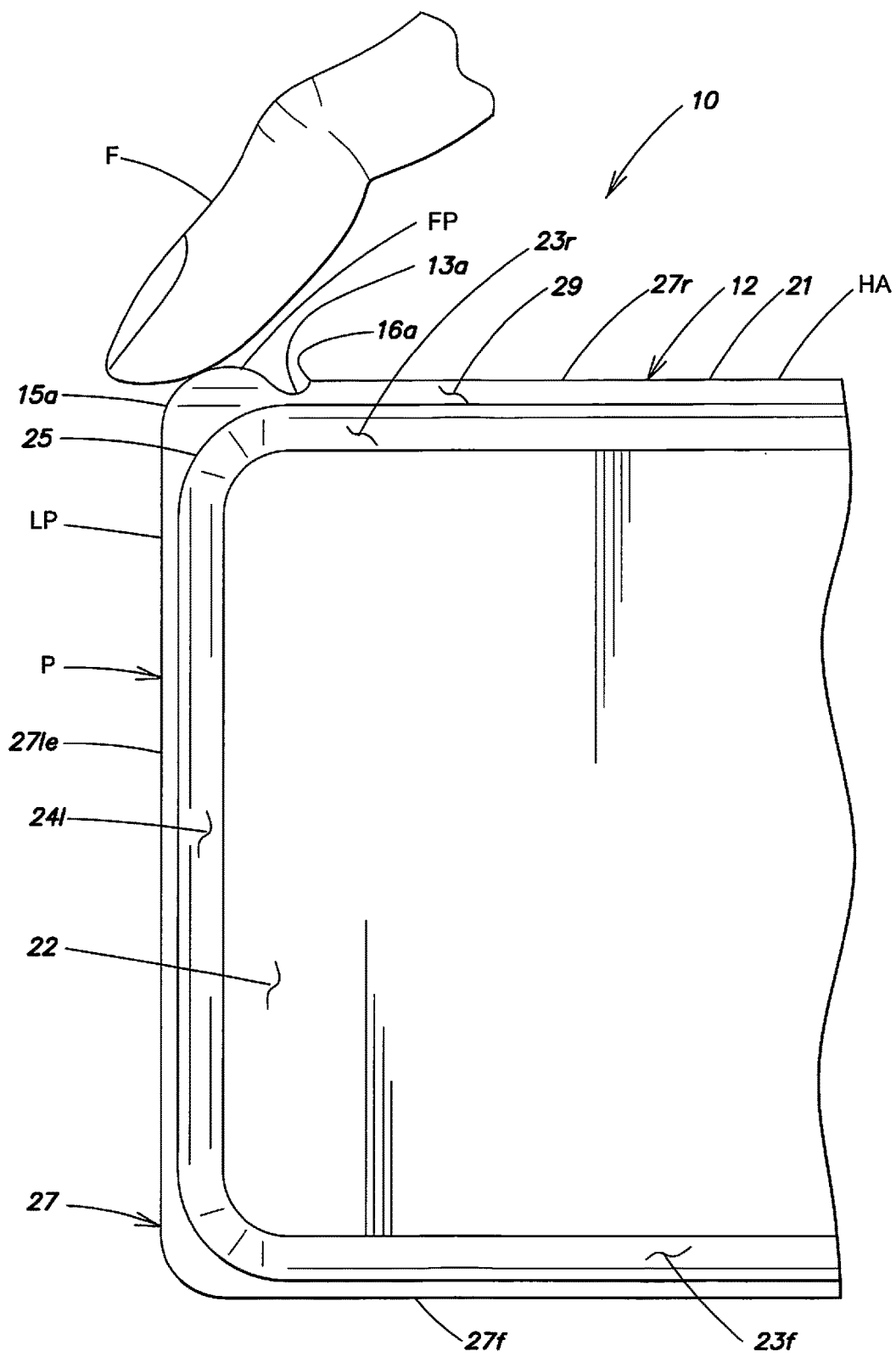
FIG. 3 is an enlarged view of the left end of the container of FIG. 2, showing a finger engaging the tear drop shaped hinge flap at one end of the hinge line.
Figure 4:
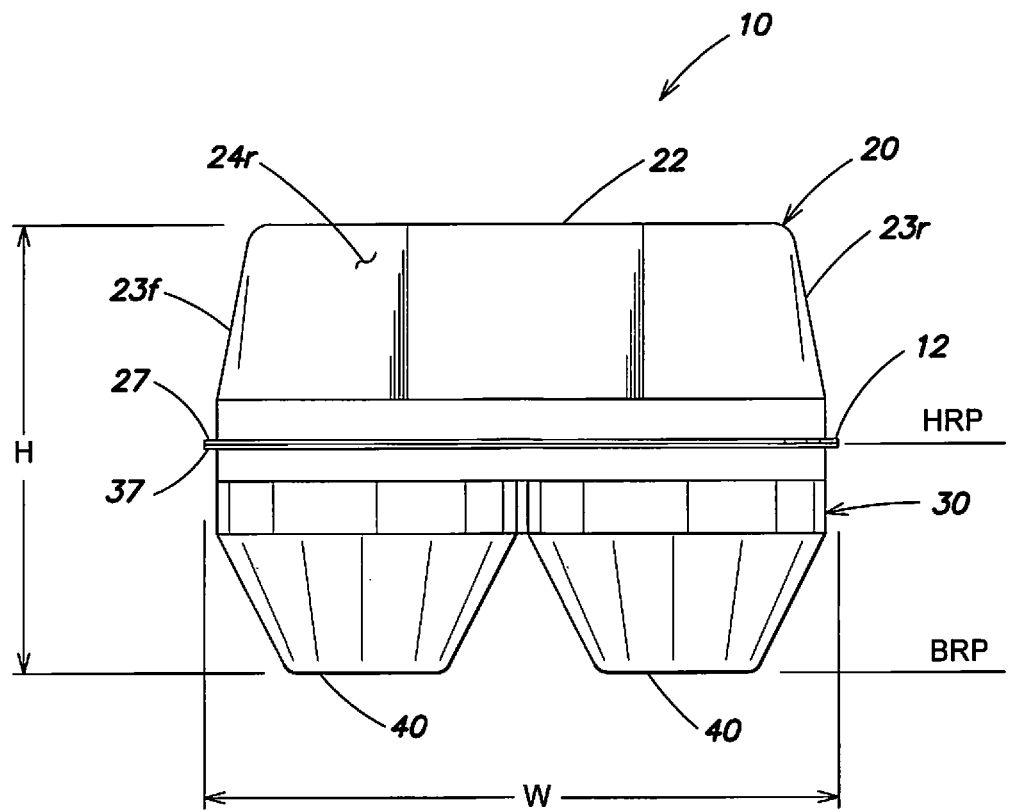
FIG. 4 is a right side elevational view of the closed carton.

As shown in FIG. 2, the carton 10 includes a flanged lid-base hinge connection 12 and protective flaps 15 designed to prevent a person from rubbing or otherwise engaging his finger F, hand or other portion of his skin over a sharp hinge trim edge 16a and 16b at each end of the axial hinge line HA when handling the carton (FIG. 3).

More specifically, FIGS. 2-7 show the lid 20 having a generally flat (planar) uppermost top wall 22 and a downwardly extending peripheral sidewall 28 surrounding the top wall, the lid sidewall having a lowermost flange 27 that mates with an uppermost assembled flange 17 of the assembled cover 50 and base 30. The assembled flange 17 consists of the cover flange 57 in mating (planar) engagement with the base flange 37, the cover flange 37 then engaging (on its opposite surface) the lid flange 27. The lid is generally rectangular in shape as defined by transverse X and Y directions, and includes two opposing (left and right) lateral end walls 24l and 24r, extending between and connecting two opposing longitudinal front and rear sidewalls 23f and 23r. In each of the four corners 25 of the lid, where a sidewall 23 joins an end wall 24, there is formed a radiused corner. A peripheral flange 27 is formed around the entire lower end of the lid, extending substantially transversally from the bottom edge of each of the opposing sidewalls 23f and 23r and end walls 24l and 24r. This substantially flat (planar) lip flange 27 has a lower-facing surface that mates with an upper-facing planar surface of peripheral flange 57 on the cover 50 (which in turn lies in planar engagement with the peripheral flange 37 of the base, as previously described). The mating (face to face engagement) of the peripheral flanges of the lid, cover and base increase the mechanical strength (stiffness) of the carton, enabling multiple cartons to be stacked vertically one on top another, and providing lateral reinforcement to prevent collapse of the carton when for example, grabbed in one hand by the consumer or when lateral forces are otherwise applied to the carton.

In accordance with the present embodiment of the invention, the hinge connection 12 connecting the lid to the base includes a folded hinge line 21 aligned along an axial hinge axis HA. The hinge connection 12 includes abutting planar wall portions 29 and 39 of the lid and base adjacent either side of the hinge line 21, respectively, the wall portions 29 and 39 having upper planar wall surfaces lying in a common hinge reference plane HRP when the lid and base are in the open position. The upper planar wall surfaces 29 and 39 are in mating (face-to-face) planar engagement, while the folded hinge line 21 forms the one edge P1 of the carton perimeter P, when the lid and base are in the closed position. The hinge line 21 and abutting planar wall portions 29 and 39 have opposing first and second trim edges 16a and 16b recessed inwardly from the rectangular perimeter P of the closed carton. First and second protective flaps 15a and 15b extend from the lid 20 adjacent the first and second trim edges 16a, 16b forming hinge guards at either end of the folded hinge line 21 respectively. Each flap 15 has a rounded perimeter FP that lies in the common plane HRP and overlaps the hinge axis HA (see FIG. 7). More specifically, a rounded perimeter inlet 13 (forming part of the trim edge) connects the trim edge perimeter of the base BP with the trim edge perimeter of the lid LP. The rounded inlet 13 extends from the flap 15 to the base perimeter BP (as best shown in FIG. 7).

As shown in FIGS. 2-3, the protective flaps 15a and 15b are immediately opposing the sharp trim edges 16a, 16b of the hinge, forming hinge "guards" that protect a user that comes in close contact with the hinge connection. The protective flaps extend out of the lid corners joining the rear edge flange 27r to the left and right end flanges 27le and 27re. The protective flaps 15 each extend slightly past the hinge axis HA and are aligned along a reference plane HRP that includes the hinge axis.

Figure 1B:
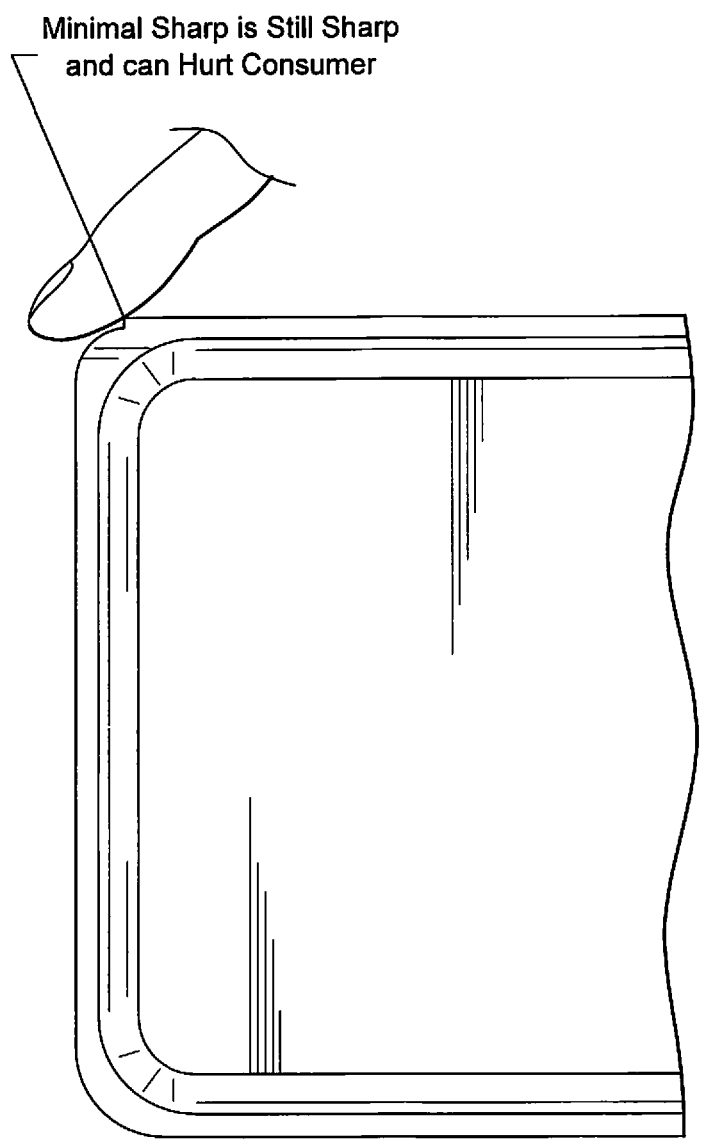

FIG. 3 is a magnified perspective view of one lateral end of the carton 10 and highlights the configuration described above. The protective flap 15a deflects a finger F away from the sharp hinge edge 16a, protecting a person handling the closed egg carton from being cut or harmed by the hinge trim edge. In contrast, FIG. 1 shows two prior art cartons, wherein the absence of a protective flap, the finger F of a person handling the carton will not be deflected away from catching on the sharp angled hinge trim edge, potentially causing a laceration.

Figure 5:
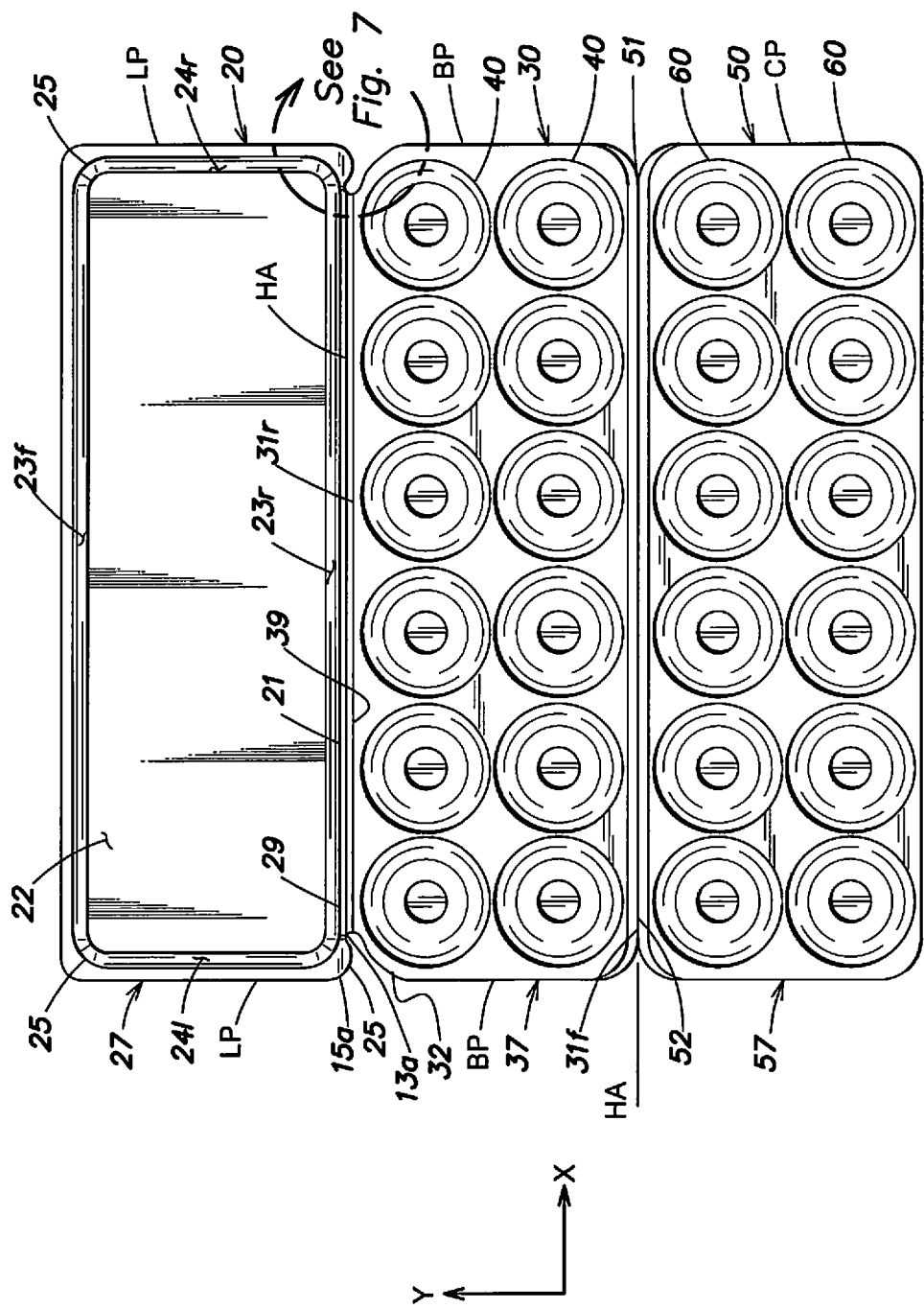
FIG. 5 is a top plan view of the egg carton in the open position.

FIG. 5 is a top perspective view of the interior of the egg carton 10 in the open position and consistent with a longitudinal direction X and a lateral direction Y. The lid 20 is hingedly connected to the base 30 by the hinge 21. The abutting planar wall portions 29, 39 of the lid and base lie adjacent either side of the hinge line 21. The base includes a peripheral base flange 27 surrounding the 6×2 array of egg receiving cells 40, the base flange including opposed front and rear longitudinal edges 27f and 27r aligned in the X direction, and opposed right and left end lateral edges 27re, 27le aligned in the Y direction, connected by four radiused corners. The front longitudinal edge 27f of the base flange is connected by a second hinge 51 to an adjacent longitudinal edge 52 of the cover 50. The cover is similar to the base, and includes a peripheral flange 57 surrounding a 2×6 array of egg receiving cells 60, wherein the cells of the cover have a complimentary alignment and shape to lie over the egg receiving cells 40 of the base, when the cover is rotated in the closed position over the base. The peripheral flanges 37 and 57 of the base and cover, in the closed position, lie in face to face engagement further supporting the structural integrity of the carton in the closed position. The lid 50 is then rotated to lie over the assembled cover and base, in the closed position, with the lid peripheral flange lying in planar engagement over the similarly mating (planar engaged) cover and base flanges (as previously described).

FIG. 7 is magnified plan view of a portion of the open egg carton around one lid-base hinge end 16b. The protective flap 15b extends toward the base 30 and to a farthest point 15b' past the hinge axis HA (as shown by distance d). The tear shaped inlet 13b is outlined by the combination of the base corner 32, hinge end 16b, and protective flap 15b. The inlet 13b provides clearance for the flap 15b to rotate about the base without being stopped by the base perimeter BP at the base corner 32.

Variations of the foregoing embodiment will be apparent to the skilled person.

In another embodiment, the egg carton has different sized arrays of egg receiving cells, such as 2×2, 3×2, 4×4, 4×6, 5×5 arrays, etc.

In an alternative embodiment, the egg carton is a bi-fold egg carton, including just a lid and base, without the cover, the eggs being positioned in individual cell pockets of the base and held there by the lid (in the closed position). The lid and base include locking nubs for connecting the lid to the base, as is well known in the art. See for example, Ramirez US 2013/0048527, which is hereby incorporated by reference in its entirety.

In various embodiments, the plastic material of the egg carton is selected from foam and non-foam materials. The plastic material of the egg carton may be one or more of polystyrene (e.g., polystyrene foam), polyester (e.g., polyethylene terephthalate (PET)), polyolefin (e.g., polyethylene (PE)), polypropylene (PP), or poly(lactic acid) (PLA), including homopolymers, copolymers, and blends thereof, and including virgin and reclaimed (recycled) materials. The solid sheet and rigid polymers, such as polyesters (e.g., PET), benefit greatly from the invention as the rigid plastic forms sharp edges at the hinge line.

While specific embodiments of the present invention have been shown and described it will be apparent that many modifications can be made thereto without departing from the scope of the invention. Accordingly, the invention is not limited by the foregoing description.

What is claimed is:

1. A plastic thermoformed hinged container comprising:
    a thermoformed plastic sheet having a trim edge and comprising a lid and a base formed from a thermoformable plastic material;
    the thermoformed sheet including a hinge connection comprising a foldable axial hinge line between adjoining edges of the lid and base for pivoting of the lid with respect to the base along the hinge line thus allowing the lid and base to be repeatedly moved between open and closed positions;
    the lid and base each having a generally rectangular perimeter with rounded base corners and having peripheral lid and base flanges that mate in planar engagement in the closed position forming a generally rectangular perimeter of the closed container with the hinge line forming one edge of the rectangular container perimeter;
    the hinge connection further comprising:
        abutting planar wall portions of the peripheral lid and base flanges adjacent either side of the hinge line lying in a common hinge reference plane (HRP) when the lid and base are in the open position, the HRP being parallel to a base reference plane (BRP) in which the base rests, the abutting planar wall portions being disposed one atop the other in mating planar engagement while the hinge line is folded to form the one edge of the rectangular container perimeter when the lid and base are in the closed position;

wherein, the hinge line and abutting planar wall portions in the closed position comprise:

first and second sharp trim edges disposed at opposing ends of the hinge line and recessed inwardly from the rectangular container perimeter in the closed position; and first and second protective flaps extending from the rectangular lid perimeter and spaced respectively from the first and second sharp trim edges by first and second rounded trim edge inlets in the lid perimeter, wherein the protective flaps extend beyond the hinge line and form hinge guards restricting access to the first and second sharp trim edges at opposing ends of the hinge line in the closed position.

2. The plastic thermoformed hinged container of claim 1, wherein:

the thermoformed plastic sheet comprises a non-foamed solid sheet of plastic material having a thickness of at least 0.01 inches.

3. The plastic thermoformed hinged container of claim 2, wherein:

the thickness of the thermoformed plastic sheet is in a range of from 0.01 inches to 0.05 inches.

4. The plastic thermoformed hinged container of claim 2, wherein:

the plastic material comprises one or more of polyester, polyolefin, and polylactic acid, including homopolymers, copolymers, and blends thereof, and including virgin and reclaimed materials.

5. The plastic thermoformed hinged container of claim 3, wherein:

the container is an egg carton comprising a non-foamed solid sheet of polyester material of a thickness in a range from 0.01 to 0.05 inches.

6. The plastic thermoformed hinged container of claim 1, wherein:

the plastic material is a foamed material.

7. The plastic thermoformed hinged container of claim 1, wherein:

the plastic material is a non-foamed material.

8. The plastic thermoformed hinged container of claim 1, wherein:

the container comprises an egg carton.

9. The plastic thermoformed hinged container of claim 8, wherein:

the egg carton is a bi-fold egg carton.

10. The plastic thermoformed hinged container of claim 9, wherein:

the thermoformed plastic sheet further comprises a cover, the cover being hingedly connected to another edge of the base lying parallel to and opposing the hinge line, for pivoting of the cover and base between open and closed positions, wherein in the closed position of the container, the cover is closed over the base, and the lid is closed over the closed cover and base.

11. A method of forming a hinged container of claim 1, including steps of:

thermoforming a sheet of thermoformable plastic material to from the lid and base;

trimming a peripheral edge of the thermoformed sheet to form the trim edges of the lid, the base, the abutting wall portions of the lid and base, the flaps and the inlets.

* * * * *